United States Patent
Voisine

(10) Patent No.: US 11,982,313 B2
(45) Date of Patent: May 14, 2024

(54) SPHERICAL PLAIN BEARING WITH LUBRICATION FEATURES

(71) Applicant: Roller Bearing Company of America, Inc., Oxford, CT (US)

(72) Inventor: James Voisine, Burlington, CT (US)

(73) Assignee: ROLLER BEARING COMPANY OF AMERICA, INC., Oxford, CT (US)

( * ) Notice: Subject to any disclaimer, the term of this patent is extended or adjusted under 35 U.S.C. 154(b) by 0 days.

(21) Appl. No.: 17/850,433

(22) Filed: Jun. 27, 2022

(65) Prior Publication Data

US 2022/0412403 A1 Dec. 29, 2022

Related U.S. Application Data

(60) Provisional application No. 63/216,165, filed on Jun. 29, 2021.

(51) Int. Cl.
*F16C 23/04* (2006.01)
*F16C 33/10* (2006.01)
(Continued)

(52) U.S. Cl.
CPC .......... *F16C 23/045* (2013.01); *F16C 33/102* (2013.01); *F16C 33/1065* (2013.01); *F16C 33/726* (2013.01); *F16C 33/74* (2013.01)

(58) Field of Classification Search
CPC .... F16C 17/105; F16C 23/043; F16C 23/045; F16C 33/106; F16C 33/1065; F16C 33/726; F16C 33/74; F16C 33/743
See application file for complete search history.

(56) References Cited

U.S. PATENT DOCUMENTS

RE24,332 E * 6/1957 Svenson .............. F16J 15/3236
277/910
2,873,132 A * 2/1959 Tanner ..................... F16J 15/32
277/436

(Continued)

FOREIGN PATENT DOCUMENTS

CN 200520083461 10/2006
DE 1869889 U 4/1963
(Continued)

*Primary Examiner* — James Pilkington
(74) *Attorney, Agent, or Firm* — Ruggiero McAllister & McMahon LLC

(57) ABSTRACT

A spherical plain bearing includes an outer ring and an inner ring that are each coaxial with a longitudinal axis of the bearing. The outer ring has a first axial outer ring end, a second axial outer ring end, and an interior spherical concave bearing surface extending therebetween. The inner ring has a first axial inner ring end, a second axial inner ring end, and an interior cylindrical bearing surface defining a bore and an exterior spherical convex bearing surface extending therebetween. The exterior spherical convex bearing surface is in interfacial sliding engagement with the interior spherical concave bearing surface. A plurality of circumferential lubrication grooves and one or more curved lubrication channels are in the exterior spherical convex bearing surface. The curved lubrication channels are positioned to intersect each of the circumferential lubrication grooves. A plurality of profiled annular lubrication grooves circumferentially extend into the interior cylindrical bearing surface.

21 Claims, 6 Drawing Sheets

(51) Int. Cl.
*F16C 33/72* (2006.01)
*F16C 33/74* (2006.01)

(56) References Cited

U.S. PATENT DOCUMENTS

| | | | |
|---|---|---|---|
| 3,243,212 A | 3/1966 | May | |
| 3,322,433 A * | 5/1967 | Rentschler | F16J 15/022 |
| | | | 525/104 |
| 4,750,847 A * | 6/1988 | Boyd | F16C 17/02 |
| | | | 384/140 |
| 4,764,035 A * | 8/1988 | Boyd | F16C 27/063 |
| | | | 384/909 |
| 4,765,757 A | 8/1988 | Hartl | |
| 5,040,905 A * | 8/1991 | Boyd | F16C 33/74 |
| | | | 384/140 |
| 6,626,575 B2 | 9/2003 | Hartl | |
| 6,712,092 B2 * | 3/2004 | Toliusis | F16K 11/048 |
| | | | 137/625.5 |
| 6,729,763 B2 | 5/2004 | Post et al. | |
| 7,257,862 B2 * | 8/2007 | Bassi | E05F 5/00 |
| | | | 16/337 |
| 8,926,185 B2 | 1/2015 | Gaumer et al. | |
| 9,670,954 B2 | 6/2017 | Turmeau et al. | |
| 10,724,575 B2 | 7/2020 | Coombe et al. | |
| 2008/0040886 A1 | 2/2008 | Arnold et al. | |
| 2009/0008892 A1* | 1/2009 | Gaumer | F16C 11/02 |
| | | | 384/322 |
| 2012/0315079 A1* | 12/2012 | Nuechterlein | F16C 23/045 |
| | | | 384/322 |
| 2015/0137486 A1 | 5/2015 | Smith et al. | |
| 2019/0093710 A1 | 3/2019 | Parker | |
| 2021/0123477 A1 | 4/2021 | Henninger et al. | |

FOREIGN PATENT DOCUMENTS

| | | |
|---|---|---|
| GB | 1191062 | 5/1970 |
| WO | 2021188378 A1 | 9/2021 |

* cited by examiner

SPHERICAL PLAIN BEARING WITH LUBRICATION FEATURES

CROSS REFERENCE TO RELATED APPLICATION

This application claims priority to commonly owned and U.S. Provisional Patent Application Ser. No. 63/216,165 filed Jun. 29, 2021, the entirety of which is incorporated herein by reference.

TECHNICAL FIELD

The present disclosure relates generally to spherical plain bearings. More particularly, the present disclosure relates to a spherical plain bearing having lubrication features and seals for increasing the lubrication volume within the bearing to improve the dynamic performance of the bearing.

BACKGROUND

Spherical plain bearings generally include inner and outer ring members wherein the outer ring member has a spherical concave interior surface that defines a cavity therein and wherein the inner ring member is disposed in the cavity and has a spherical convex surface that is complementary to, and is dimensioned to match, the interior concave surface of the outer ring member. In the assembled bearings, the concave and convex surfaces slide over each other to define the bearing surfaces or "load zone."

A lubricant may be provided in the load zone of the bearing to minimize wear and to enhance rotational characteristics. In some spherical plain bearings, a lubrication groove may be provided in one of the sliding surfaces. The lubrication groove is a recess from the sliding surface within which a reserve of lubricant can be disposed. The recess is open to the other sliding surface, which can be contacted by the lubricant. As the second surface slides over the first, lubricant is carried between the sliding surfaces to lubricate the bearing. A conventional lubrication groove has sharp edges at the sliding surface of the ring member on which is it formed. The sharp edges tend to wipe lubricant from the surface as one ring member moves relative to the other ring member, thus inhibiting lubricant from lubricating the bearing.

Also, in some spherical plain bearings, seals may be incorporated to retain the lubricant in the load zone and to prevent or at least limit the flow of lubricant from the load zone. These configurations have a natural tendency to be easily removed after wear has occurred (either inadvertently or intentionally) or to be difficult to position in place initially. Additionally, these sealing members are often undesirably located on the edges of the ring members of the bearings and adjacent to the contact surfaces of the load zone. When located on the edges of the ring members and adjacent to the contact surfaces of the load zone, the sealing members are easily damaged and/or dislodged, which makes it harder to maintain the seal to retain the lubricant in the load zone. Furthermore, the wiping function of the seal (ability to spread the lubricant on the bearing surface proximate the area at which the seal contacts the bearing surface) may be compromised. Moreover, the seals may completely seal the load zone, which generates internal lubricant pressure. Excessive internal lubricant pressure generates a hydraulic pressure lock that prevents rotation of the bearing.

Thus, there is a need for an improved spherical plain bearing that overcomes the foregoing problems.

SUMMARY

According to aspects illustrated herein, there is provided a spherical plain bearing including an outer ring and an inner ring that are each coaxial with a longitudinal axis of the bearing. The outer ring has a first axial outer ring end, a second axial outer ring end opposing the first axial outer ring end, and an interior spherical concave bearing surface that extends between the first axial outer ring end and the second axial outer ring end. The inner ring has a first axial inner ring end, a second axial inner ring end opposing the first axial inner ring end, an interior cylindrical bearing surface defining a bore that extends between the first axial inner ring end and the second axial inner ring end, and an exterior spherical convex bearing surface that extends between the first axial inner ring end and the second axial inner ring end. The exterior spherical convex bearing surface is in interfacial sliding engagement with the interior spherical concave bearing surface of the outer ring. A plurality of circumferential lubrication grooves are in the exterior spherical convex bearing surface of the inner ring. One or more curved lubrication channels are in the exterior spherical convex bearing surface of the inner ring. The one or more curved lubrication channels are positioned to intersect each of the plurality of circumferential lubrication grooves. A plurality of profiled annular lubrication grooves circumferentially extend into the interior cylindrical bearing surface of the inner ring.

In one embodiment, a first seal groove extends radially outward into the interior spherical concave bearing surface proximate the first axial outer ring end. A first annular seal is disposed in the first seal groove. A second seal groove extends radially outward into the interior spherical concave bearing surface proximate the second axial outer ring end. A second annular seal is disposed in the second seal groove.

In one embodiment, the first annular seal and the second annular seal each have an anti-twist cross section.

In one embodiment, the anti-twist cross section of the first annular seal and the second annular seal includes a rectangular central portion and a rounded projection located at each corner of the rectangular central portion.

In one embodiment, a first scraper groove is in the interior spherical concave bearing surface of the outer ring between the first seal groove and the first axial outer ring end. A second scraper groove is in the interior spherical concave bearing surface of the outer ring between the second seal groove and the second axial outer ring end.

In one embodiment, a third seal groove extends radially outward into the interior cylindrical bearing surface proximate the first axial inner ring end. A third annular seal is disposed in the third seal groove. A fourth seal groove extends radially outward into the interior cylindrical bearing surface proximate the second axial inner ring end. A fourth annular seal is disposed in the fourth seal groove.

In one embodiment, the third annular seal and the fourth annular seal each have an anti-twist cross section.

In one embodiment, the anti-twist cross section of the third annular seal and the fourth annular seal includes a rectangular central portion and a rounded projection at each corner of the rectangular central portion.

In one embodiment, a first vent port extends axially inward from the first axial inner ring end to a radially outermost end of the third seal groove. A second vent port extends axially inward from the second axial inner ring end to a radially outermost end of the fourth seal groove.

In one embodiment, each of the plurality of profiled annular lubrication grooves includes a contoured shape that is defined by a concave central portion and two opposing convex side portions.

In one embodiment, the concave central portion of the profiled annular lubrication grooves conforms substantially to a circular arc that is defined by a continuous first radius of curvature that has a first center point on a line that is perpendicular to the interior cylindrical bearing surface. Each of the convex side portions of the profiled annular lubrication grooves conforms substantially to circular arcs that are defined by blend radii that has a continuous second radius of curvature that has second center points on lines that are perpendicular to the interior cylindrical bearing surface.

In one embodiment, the second radius of curvature is smaller in magnitude than a depth of the profiled annular lubrication groove.

In one embodiment, the first radius of curvature transitions into each of the second radius of curvature of the blend radii at a transition point.

In one embodiment, one or more outer ring lubrication holes extend from an exterior surface of the outer ring to the interior spherical concave bearing surface of the outer ring. The one or more outer ring lubrication holes are substantially perpendicular to the longitudinal axis.

In one embodiment, the one or more outer ring lubrication holes are radially aligned with one of the plurality of circumferential lubrication grooves.

In one embodiment, a lubricant is disposed at the location of interfacial sliding engagement of the interior spherical concave bearing surface of the outer ring and the exterior spherical convex bearing surface of the inner ring.

In one embodiment, one or more inner ring lubrication holes extend from the exterior spherical convex bearing surface of the inner ring to the interior cylindrical bearing surface of the inner ring. The one or more inner ring lubrication holes are substantially perpendicular to the longitudinal axis.

In one embodiment, the one or more inner ring lubrication holes are radially aligned with one of the plurality of profiled annular lubrication grooves.

In one embodiment, a lubricant is disposed at a location of interfacial sliding engagement of the interior cylindrical bearing surface of the inner ring and an exterior cylindrical bearing surface of a member that is received in the bore of the inner ring.

In one embodiment, each of the plurality of circumferential lubrication grooves extend continuously around the exterior spherical convex bearing surface of the inner ring.

There is further disclosed herein an annular seal for a bearing which includes an anti-twist cross section. The anti-twist cross section includes a rectangular central portion and a lobe located at each corner of the rectangular central portion.

In some embodiments, a recess defined along each side of the rectangular central portion between adjacent lobes.

In some embodiments, the lobes have a rounded shape.

In some embodiments, a first radial hole is formed substantially perpendicular to and extends into the third seal groove and intersects the first vent hole; and/or a second radial hole is formed substantially perpendicular to and extends into the fourth seal groove and intersects the second vent hole.

In some embodiments, the first radial hole is formed on an inboard side of the third annular seal and/or the second radial hole is formed on an inboard side of the fourth annular seal.

Any of the foregoing embodiments may be combined.

BRIEF DESCRIPTION OF THE DRAWING

Referring now to the Figures, which are exemplary embodiments, and wherein the like elements are numbered alike.

DETAILED DESCRIPTION

Figure 1:
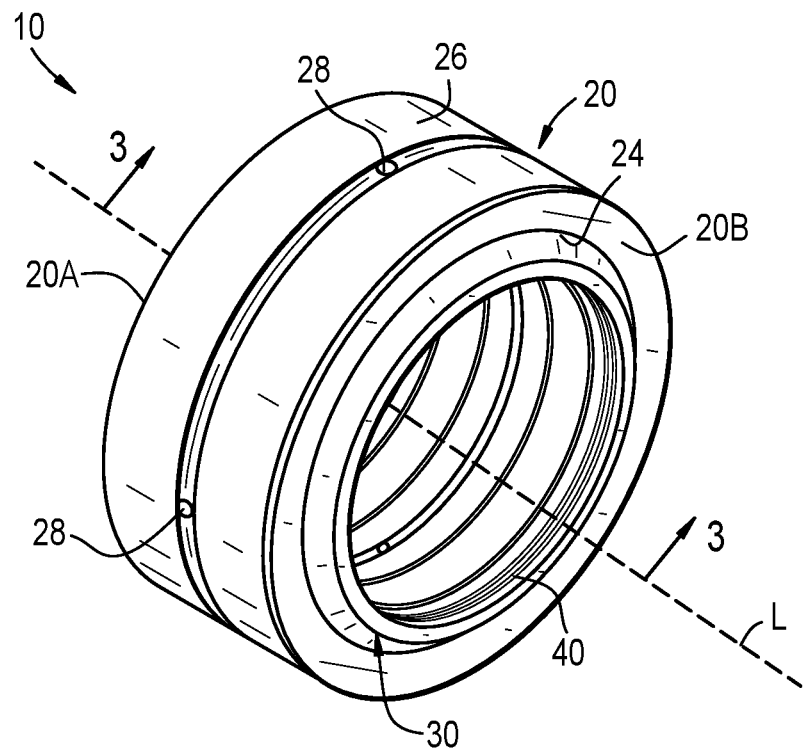
FIG. 1 is an isometric view of a spherical plain bearing according to an embodiment of the present invention.
Figure 3A:
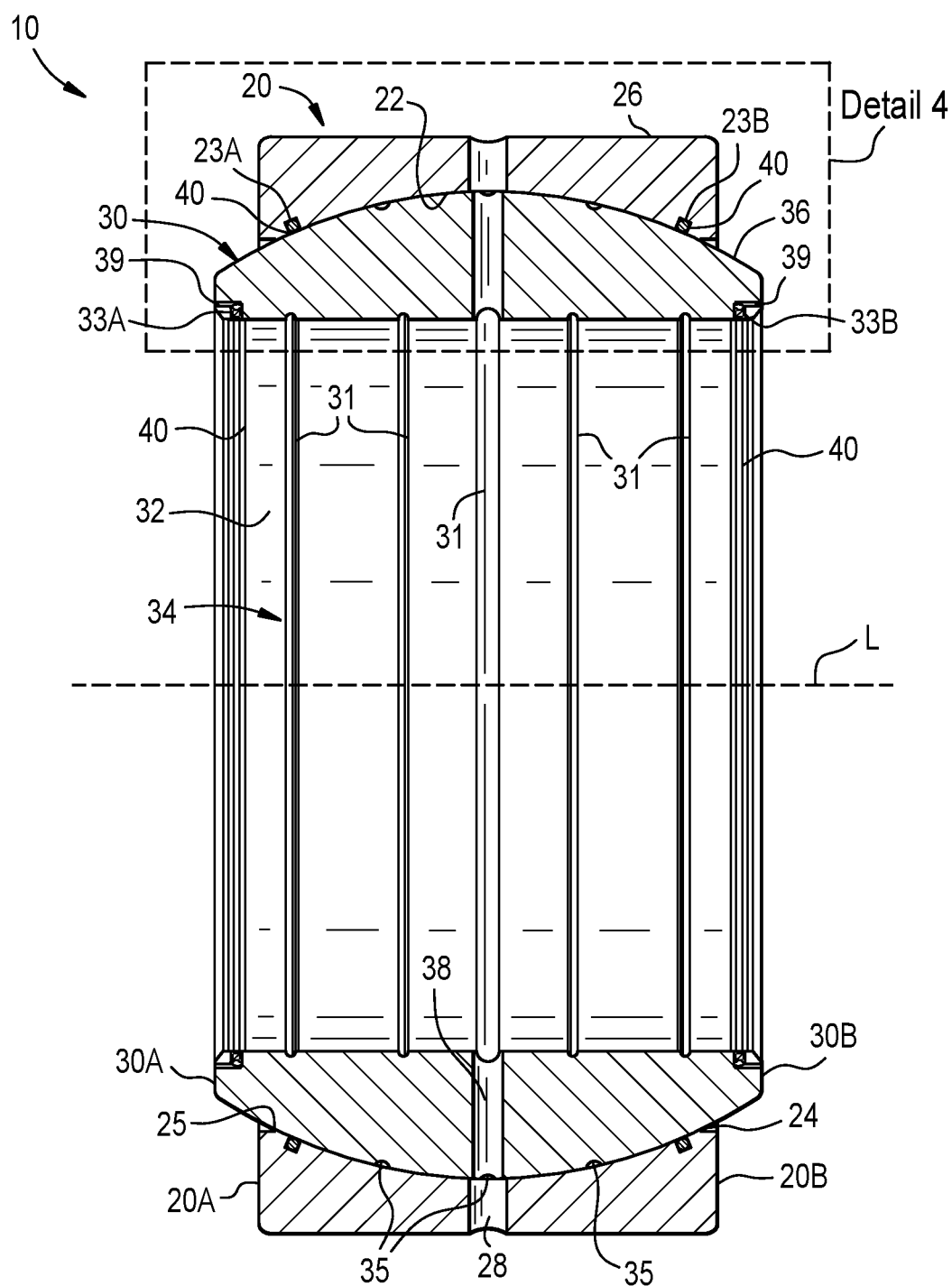
FIG. 3A is a cross sectional view of the spherical plain bearing of FIG. 1 taken along section line 3-3.
Figure 4:
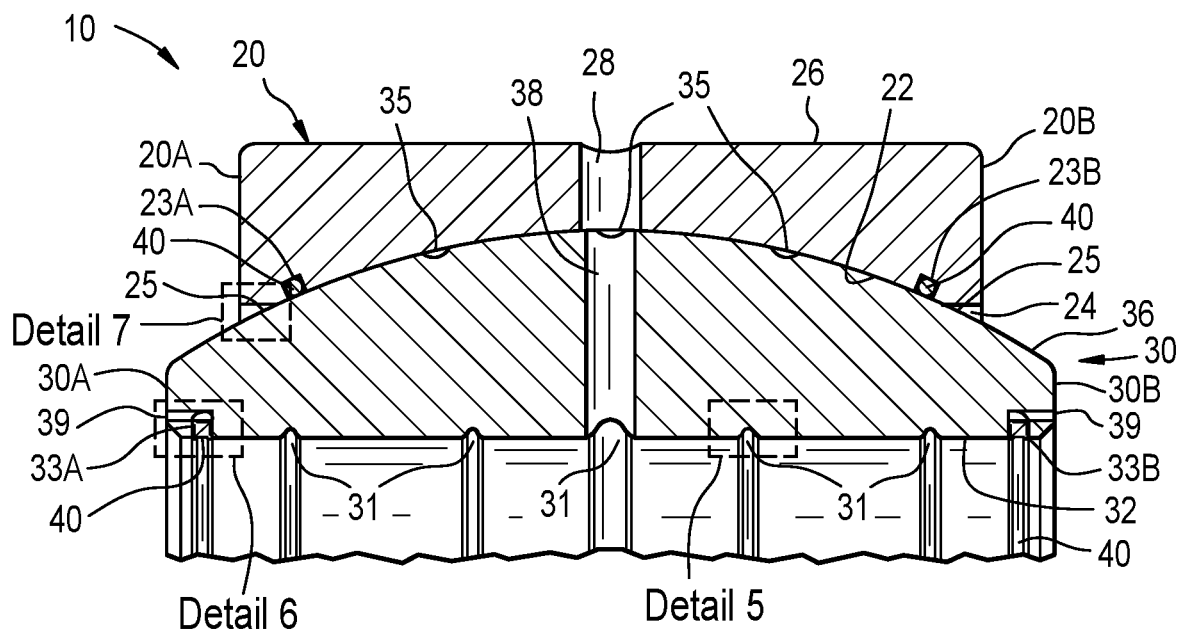
FIG. 4 is an enlarged view of Detail 4 of FIG. 3A, showing an exemplary interface of the outer ring and the inner ring of the spherical plain bearing.

As shown in FIG. 1, a spherical plain bearing is generally designated by the number 10. The bearing 10 includes an outer ring 20 and an inner ring 30. The outer ring 20 is coaxial with a longitudinal axis L of the bearing 10 and has a first axial outer ring end 20A and a second axial outer ring end 20B opposing the first axial outer ring end 20A. The outer ring 20 has an interior spherical concave bearing surface 22 that extends between the first axial outer ring end 20A and the second axial outer ring end 20B, as shown in FIGS. 1, 3A, and 4. The interior spherical concave bearing surface 22 defines an opening 24.

Figure 2:
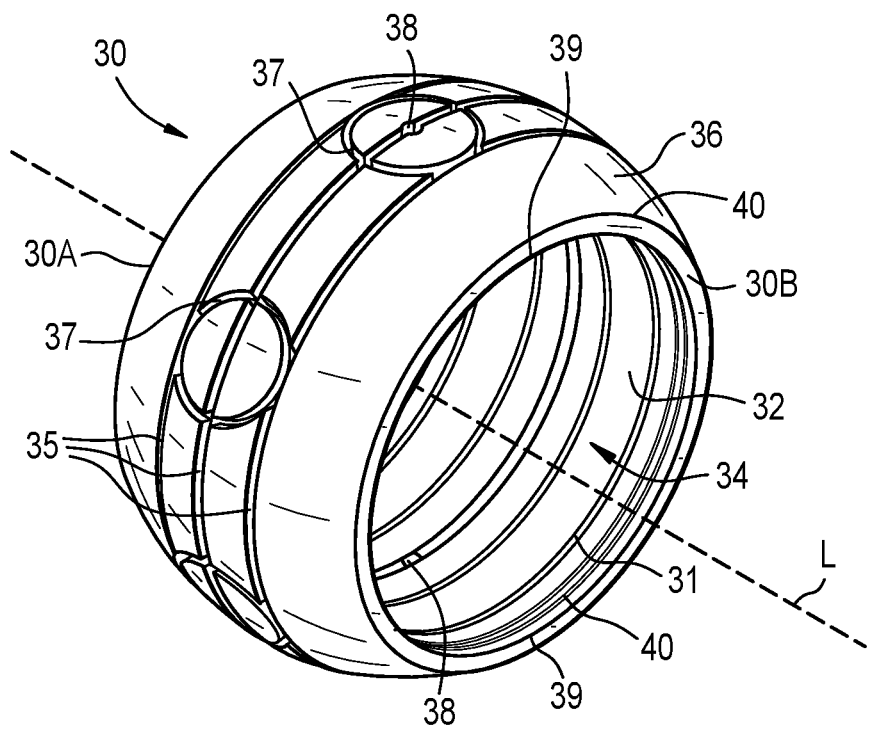
FIG. 2 is an isometric view of the inner ring of the spherical plain bearing of FIG. 1.

As shown in FIG. 2, the inner ring 30 is coaxial with the longitudinal axis L and has a first axial inner ring end 30A and a second axial inner ring end 30B opposing the first axial inner ring end 30A. The inner ring 30 has an interior cylindrical bearing surface 32 that extends between the first axial inner ring end 30A and the second axial inner ring end 30B. The interior cylindrical bearing surface 32 defines a bore 34. The inner ring 30 has an exterior spherical convex bearing surface 36 that extends between the first axial inner ring end 30A and the second axial inner ring end 30B. As shown in FIGS. 1, 3A, and 4, the exterior spherical convex bearing surface 36 of the inner ring 30 substantially conforms in shape to the interior spherical concave bearing surface 22 of the outer ring 20, and the inner ring 30 is received in the opening 24 of the outer ring 20 such that the exterior spherical convex bearing surface 36 is located in interfacial sliding engagement with the interior spherical concave bearing surface 22.

As shown in FIGS. 2, 3A, and 4, the inner ring 30 has a plurality of circumferential lubrication grooves 35 that extend radially inward into and circumferentially along the exterior spherical convex bearing surface 36. The circumferential lubrication grooves 35 as shown in the figures are not profiled. In some embodiments, the circumferential lubrication grooves 35 are profiled (having the contoured shape described in detail below regarding the profiled annular lubrication grooves 31) to further improve the flow of a lubricant (e.g., grease, oil, etc.) along the interface of the interior spherical concave bearing surface 22 and the exterior spherical convex bearing surface 36. In the embodiment shown in FIG. 2, the inner ring 30 has three circumferential grooves 35 that are continuous along the exterior spherical convex bearing surface 36 (i.e. the circumferential grooves 35 extend 360 degrees around the inner ring 30). One of the three circumferential grooves 35 is centrally located as measured between the first axial inner ring end 30A and the second axial inner ring end 30B, and the two other circumferential grooves 35 are symmetrically spaced apart on opposing sides of and parallel to the centrally located circumferential groove 35. However, the present invention is not limited thereto and contemplates having more or less than three circumferential grooves 35 and in different arrangements, including but not limited to the inner ring 30 having 2, 5, 7, etc. circumferential grooves 35 that are parallel or not parallel to each other, intersect each other, extend 360 degrees or less than 360 degrees around the inner ring 30, or combinations thereof.

As shown in FIG. 2, the inner ring 30 has one or more curved lubrication channels 37 that extend radially inward into the exterior spherical convex bearing surface 36. The curved (e.g., arcuate) lubrication channels 37 extend along the exterior spherical convex bearing surface 36 and are positioned such that each curved lubrication channel 37 intersects each of the plurality of circumferential lubrication grooves 35. The curved lubrication channels 37 as shown in the figures are not profiled. In some embodiments, the circumferential lubrication channels 37 are profiled (having the contoured shape described in detail below regarding the profiled annular lubrication grooves 31) to further improve the flow of a lubricant (e.g., grease, oil, etc.) along the interface of the interior spherical concave bearing surface 22 and the exterior spherical convex bearing surface 36. In embodiments having more than one curved lubrication channel 37, the curved lubrication channels 37 are spaced equally apart along the exterior spherical convex bearing surface 36, and there may be, for example, 2, 3, 4, 5, 6, etc. curved lubrication channels 37. In the embodiment shown in FIG. 2, the curved lubrication channels 37 are substantially circular in shape. However, the present invention is not limited thereto and contemplates the curved lubrication channels 37 having different shapes, including but not limited to oval shapes, elliptical shapes, arc segments, etc.

Figure 3B:
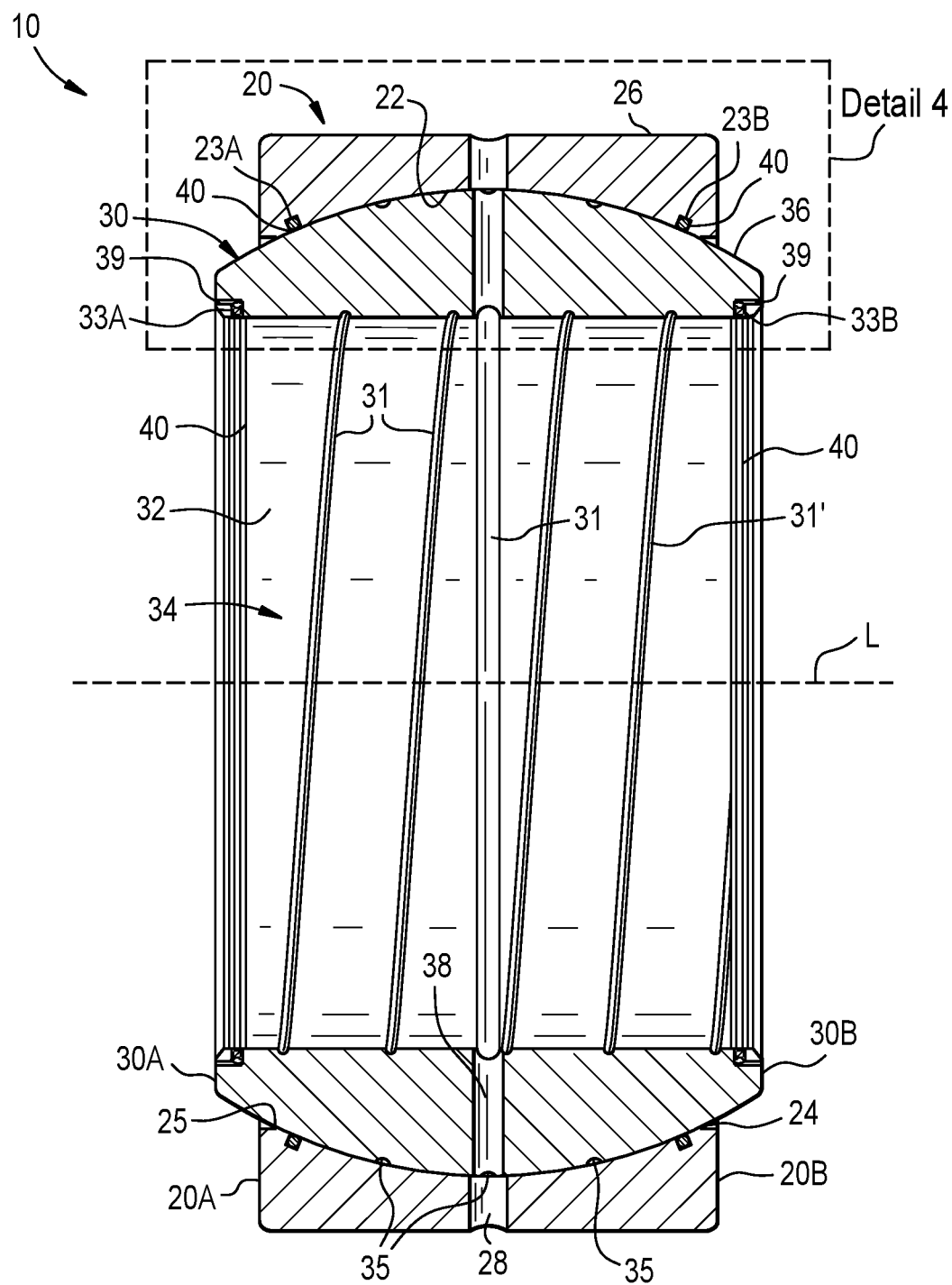
FIG. 3B is an alternative embodiment of FIG. 3A with a spiral groove.

As shown in FIGS. 2, 3A, and 4, the inner ring 30 has a plurality of profiled annular lubrication grooves 31 that extend radially outward into and circumferentially along the interior cylindrical bearing surface 32. In the embodiment shown in FIG. 3, the inner ring 30 has five profiled annular lubrication grooves 31 that are continuous along the interior cylindrical bearing surface 32 (i.e. the profiled annular lubrication grooves 31 extend 360 degrees around the bore 34). One of the five annular profiled lubrication grooves 31 is centrally located as measured between the first axial inner ring end 30A and the second axial inner ring end 30B, and the four other profiled annular lubrication grooves 31 are symmetrically spaced apart on opposing sides of and parallel to the centrally located profiled annular lubrication groove 31. Because the profiled annular lubrication grooves 31 are not connected (i.e. parallel to each other), they have a contoured shape (described in detail below) that permits a lubricant (e.g., grease, oil, etc.) to flow along the interface of the interior cylindrical bearing surface 32 and an exterior cylindrical bearing surface of a member (e.g., a shaft) (not shown) received in the bore 34 toward the vent ports 39 (described in detail below). The inventors have surprisingly discovered that without the contoured shaped of the profiled annular lubrication grooves 31, the lubricant cannot flow toward the vent ports 39. Although the figures depict an embodiment having five parallel profiled annular lubrication grooves 31, the present invention is not limited thereto and contemplates having more or less than five profiled annular lubrication grooves 31 and in different arrangements, including but not limited to the inner ring 30 having 2, 3, 4, 6, 7, etc. profiled annular lubrication grooves 31 that are parallel or not parallel to each other, intersect each other, extend 360 degrees or less than 360 degrees around the bore 43, or combinations thereof. In some embodiments, the interior cylindrical bearing surface 32 has a spiral groove configuration 31' formed therein, as shown in FIG. 3B. The spiral groove configuration 31' includes two spiral grooves that intersect a centrally located profiled annular lubrication groove 31 and intersect the third seal groove 33A and the fourth seal groove 33B. The spiral groove configuration 31' is a helical groove in the interior cylindrical bearing surface 32 at a given pitch that breaks into the third and fourth seal grooves 33A, 33B, respectively. This gives the grease a direct path or channel to the third and fourth seal grooves 33A, 33B where the vent ports 39 are located.

Figure 5:
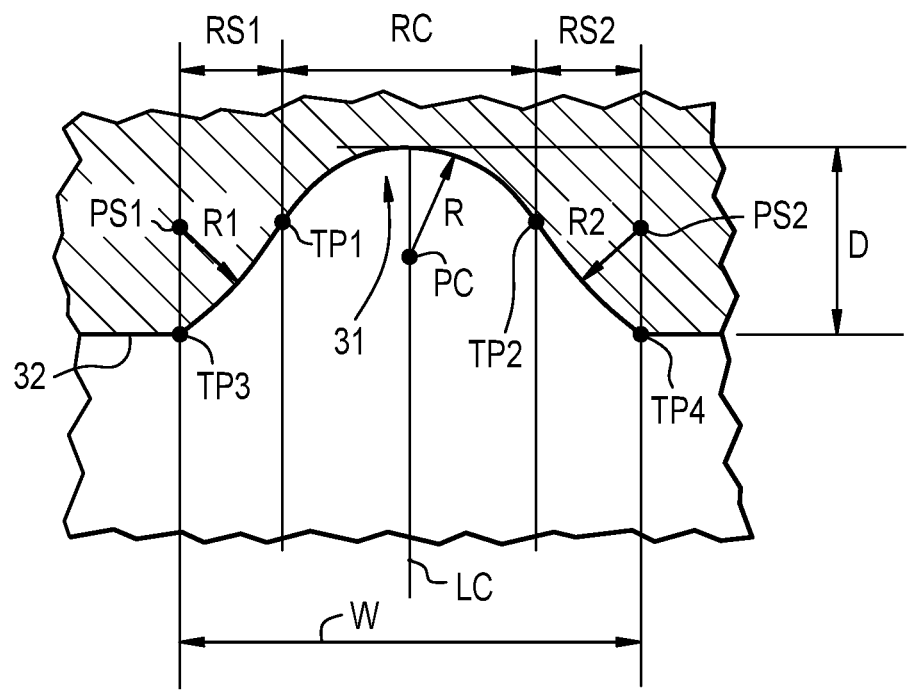
FIG. 5 is an enlarged view of Detail 5 of FIG. 4, showing an exemplary profiled annular groove of the spherical plain bearing.

As shown in FIG. 5, each profiled annular lubrication groove 31 has a contoured shape defined by a concave central portion RC conforming substantially to a circular arc defined by a first radius of curvature R, a first center point PC of which is on a line LC that is perpendicular to the interior cylindrical bearing surface 32. The first center point PC is offset from the interior cylindrical bearing surface 32. The profiled annular lubrication groove 31 is further defined by convex side portions RS1 and RS2 that conform substantially to circular arcs defined by blend radii having a second radius of curvature R1 and R2 having second center points PS1 and PS2, respectively, on lines that extend perpendicular to the interior cylindrical bearing surface 32. The first radius of curvature R transitions into each of the second radius of curvatures R1 and R2 of the blend radii at transition points TP1 and TP2, respectively. The second radius of curvature R1, R2 is smaller in magnitude than a depth D of the profiled annular lubrication groove 31. In some embodiments, the convex side portions RS1 and RS2 merge substantially tangentially with the interior cylindrical bearing surface 32 at transition points TP3 and TP4, respectively. The contoured shape of the profiled annular lubrication groove 31 allows for periodic flushing of a lubricant (e.g., grease, oil, etc.) when additional lubricant is introduced into the profiled annular lubrication groove 31 under pressure.

In some embodiments, the second radius of curvature R1, R2 substantially equal to the first radius of curvature R. For example, in one illustrative embodiment, the first radius of curvature R is equal to about 0.06 inches (1.52 mm) and the second radius of curvature R1, R2 is equal to about 0.04 inches (1.02 mm). In such embodiment, the profiled annular lubrication groove 31 has a width W of about 0.175 inches (4.45 mm) and a depth D of about 0.05 inches (1.27 mm). In some embodiments, the second radius of curvature R1, R2 is greater than or equal to 0.7 times the first radius of curvature R. For example, when the first radius of curvature R is 0.06 inches (1.52 mm), the second radius of curvature R1, R2 is about 0.042 inches (1.07 mm) or greater, and when the first radius of curvature R is 0.09 inches (2.29 mm), the second radius of curvature R1, R2 is about 0.063 inches (1.60 mm) or greater. In another illustrative embodiment, the first radius of curvature R is equal to about 0.05 inches (1.27 mm) and the second radius of curvature R1, R2 is equal to about 0.035 inches (0.89 mm). In such embodiment, the profiled annular lubrication groove 31 has a width W of about 0.11 inches (2.79 mm) and a depth D of about 0.04 inches (1.02 mm). In some embodiments, one or more of the profiled annular lubrication grooves 31 have sharp edges, contoured sides, or both. In some embodiments, the profiled annular lubrication grooves 31 have the contoured shaped described in U.S. Pat. No. 8,926,185, the contents of which are incorporated in its entirety herein.

As shown in FIGS. 3A and 4, the outer ring 20 has a first seal groove 23A that extends radially outward into and circumferentially along the interior spherical concave bearing surface 22. The first seal groove 23A is located proximate the first axial outer ring end 20A. A first annular seal 40 is disposed in the first seal groove 23A. The outer ring 20 has a second seal groove 23B that extends radially outward into and circumferentially along the interior spherical concave bearing surface 22. The second seal groove 23B is located proximate the second axial outer ring end 20B. A second annular seal 40 is disposed in the second seal groove 23B. The inner ring 30 has a third seal groove 33A that extends radially outward into and circumferentially along the interior cylindrical bearing surface 32. The third seal groove 33A is located proximate the first axial inner ring end 30A. A third annular seal 40 is disposed in the third seal groove 33A. The inner ring 30 has a fourth seal groove 33B that extends radially outward into and circumferentially along the interior cylindrical bearing surface 32. The fourth seal groove 33B is located proximate the second axial inner ring end 30B. A fourth annular seal 40 is disposed in the fourth seal groove 33B.

Figure 6A:
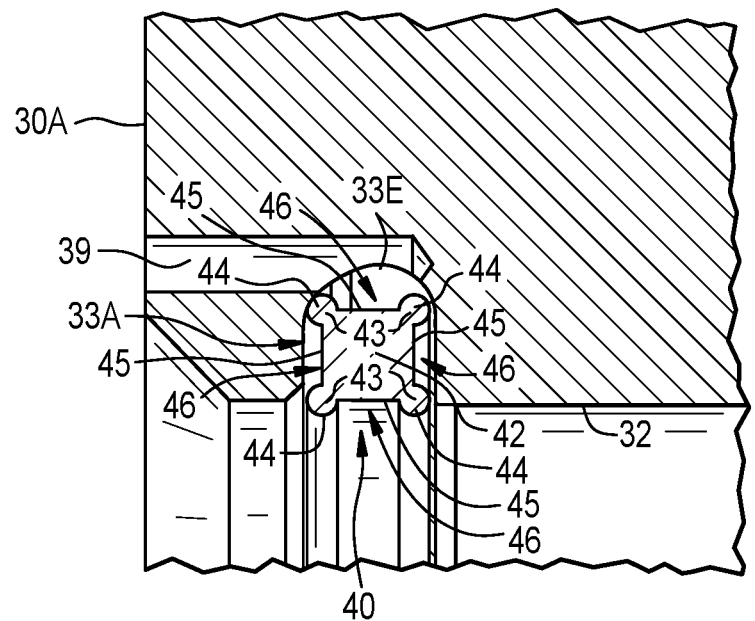
FIG. 6A is an enlarged view of Detail 6 of FIG. 4, showing an exemplary annular seal of the spherical plain bearing.

As shown in FIGS. 3A, 4, and 6, the third and fourth seal grooves 33A, 33B each have a vent port 39 that extends axially inward from the respective first and second axial inner ring ends 30A, 30B to a radially outermost end 33E of the respective third and fourth seal groove 33A, 33B. As shown in FIGS. 2 and 3A, the first axial inner ring end 30A and the second axial inner ring end 30B each have two vent ports 39 that are evenly spaced along the circumferences thereof. However, the present invention is not limited thereto and contemplates the first and second axial inner ring ends 30A, 30B each having any number and arrangement of vent ports 39 positioned therein, including but not limited to 3, 4, 5, 6, etc. vent ports 39 evenly spaced along the circumferences of the first and second axial inner ring ends 30A, 30B, and the first and second axial inner ring ends 30A, 30B each having one continuous vent port 39 that extends circumferentially along the third and fourth seal grooves 33A, 33B, respectively.

Figure 6B:
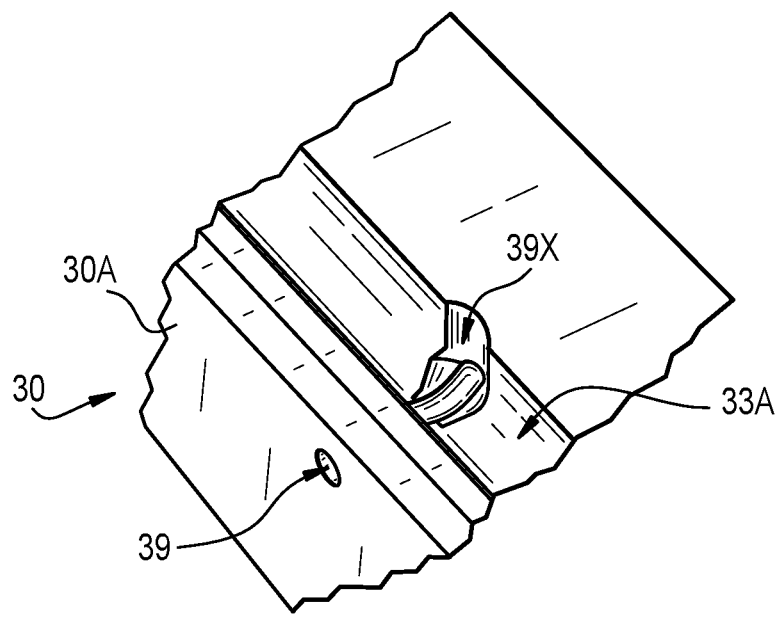
FIG. 6B is a perspective view of the seal groove and vent port of FIG. 6A shown with a radial hole therein.

As shown in FIG. 6B, in some embodiments, the third seal groove 33A has a radial hole 39X that is drilled or formed generally perpendicular to and on an inboard side of the third seal groove 33A. The radial hole 39X intersects and is in fluid communication with the vent port 39. The radial hole 39X provides an additional grease groove on the inboard side of the third seal groove 33A so that grease flows around (e.g., to the outside diameter of the annular seal 40) the annular seal 40 mitigates or eliminates the vent port 39 becoming obstructed by the annular seal 40. The fourth seal groove 33B has a radial hole 39X that is drilled perpendicular to and on an inboard side of the fourth seal groove 33B, similar to that described herein with reference to FIG. 6B and the third seal groove 33A. While the radial holes 39X are shown and described as being drilled or formed generally perpendicular to and on an inboard side of the third seal groove 33A and/or the inboard side of the fourth seal groove 33B, the present invention is not limited in this regard as other orientations of the radial hole 39X are included in the present invention including an angled hole and/or a hole located on an outboard side of the respective one of the third seal groove 33A and/or the fourth seal groove 33B.

An exemplary annular seal 40 as positioned in each of the seal grooves 23A, 23B, 33A, 33B is shown in FIGS. 3A and 4. The annular seal 40 shown in the figures is formed of a flexible elastomer material, but the present invention contemplates forming the annular seal 40 of a different material, such as a hard thermoplastic material. As shown in FIG. 6, the annular seal 40 has an anti-twist cross section such that the annular seal 40 does not twist or roll out of the seal groove 23A, 23B, 33A, 33B when in response to frictional forces generated by the interfacial sliding engagement of the interior spherical concave bearing surface 22 of the outer ring 20 and the exterior spherical convex bearing surface 36 of the inner ring 30, frictional forces generated by the interfacial sliding engagement of the interior cylindrical bearing surface 32 of the inner ring 30 and an exterior cylindrical bearing surface of a member (e.g., a shaft) (not shown) received in the bore 34 of the inner ring 30, and distortion and extrusion caused by internal lubricant pressure. In embodiments wherein the annular seal 40 is formed of a flexible elastomer material, the anti-twist cross section is also required to ensure that the annular seal 40 conforms to the exterior spherical convex bearing surface 36 to form and maintain an air-tight seal. The anti-twist cross section is formed of a rectangular central portion 42 and a lobe 44 (i.e. a rounded projection) located at each corner 43 of the rectangular central portion 42. A recess 46 (e.g., a lubricant reservoir) is defined along each side 45 of the rectangular central portion 42 by adjacent lobes 44. The recesses 46 are configured to capture lubricant (e.g., grease, oil, etc.) and reduce friction and wear of the annular seal 40.

As shown in FIGS. 3A and 4, the outer ring 20 includes one or more outer ring lubrication holes 28 that extend from an exterior surface 26 of the outer ring 20 to the interior spherical concave bearing surface 22. The outer ring lubrication hole 28 is substantially perpendicular to the longitudinal axis L and is radially aligned with one of the plurality of circumferential lubrication grooves 35. In the embodiment shown in FIGS. 3A and 4, the outer ring lubrication hole 28 is radially aligned with a circumferential lubrication groove 35 that is centrally located as measured between the first axial inner ring end 30A and the second axial inner ring end 30B. However, the present invention is not limited thereto and contemplates radially aligning the outer ring lubrication hole 28 with a non-centrally located circumferential lubrication groove 35. The outer ring lubrication hole 28 is configured to deliver a lubricant to the location of interfacial sliding engagement of the interior spherical concave bearing surface 22 of the outer ring 20 and the exterior spherical convex bearing surface 36 of the inner ring 30. The lubricant travels down the outer ring lubrication hole 28, into one of the circumferential lubrication grooves 35, and, via the curved lubrication channel 37, travels into the other circumferential lubrication grooves 35. The circumferential lubrication grooves 35 and the curved lubrication channels 37 enhance lubricant coverage of the interface of the interior spherical concave bearing surface 22 and the exterior spherical convex bearing surface 36 and enlarge the lubricant reservoir of the bearing 10 to increase the dynamic load capability of the bearing 10 and to extend the life of the bearing 10. The first and second annular seals 40 are configured to prevent lubricant purge and drive the lubricant to the inner ring lubrication hole 38, described in detail below. In some embodiments, the curved lubrication channel 37 has a circular shape and the outer ring lubrication hole 28 is substantially centrally aligned with the curved lubrication channel 37.

As shown in FIGS. 3A and 4, the inner ring 30 includes one or more inner ring lubrication holes 38 that extend from the exterior spherical convex bearing surface 36 to the interior cylindrical bearing surface 32. The inner ring lubrication hole 38 is substantially perpendicular to the longitudinal axis L and is radially aligned with one of the plurality of profiled annular lubrication grooves 31. In the embodiment shown in FIGS. 3A and 4, the inner ring lubrication hole 38 is radially aligned with a profiled annular lubrication groove 31 that is centrally located as measured between the first axial inner ring end 30A and the second axial inner ring end 30B. However, the present invention is not limited thereto and contemplates radially aligning the inner ring lubrication hole 38 with a non-centrally located profiled annular lubrication groove 31. In some embodiments, the curved lubrication channel 37 has a circular shape and the inner ring lubrication hole 38 is substantially centrally aligned with the curved lubrication channel 37, as shown in FIG. 2. The inner ring lubrication hole 38 is configured to deliver the lubricant to a location of interfacial sliding engagement of the interior cylindrical bearing surface 32 of the inner ring 30 and an exterior cylindrical bearing surface of a member (e.g., a shaft) (not shown) received in the bore 34 of the inner ring 30. The third and fourth annular seals 40 are configured to seal the interface of the interior cylindrical bearing surface 32 and the exterior cylindrical bearing surface of the shaft, which generates internal lubricant pressure. The vent ports 39 are configured to relieve the lubricant pressure to avoid generating a hydraulic pressure lock, which would prevent rotation of the bearing 10. The vent ports 39 are also configured to restrict lubricant flow out of the bearing 10 to generate pressure inside the bearing 10, which permits the void volume within the bearing 10 to be completely filled with lubricant. The present invention contemplates various diameter sizes and number of vent ports 39 to ensure the desired amount of internal pressure. The profiled annular lubrication grooves 31 enhance lubricant flow to the vent ports 39, enhance lubricant coverage of the interface of the interior cylindrical bearing surface 32 and the exterior cylindrical bearing surface of the shaft, and enlarge the lubricant reservoir of the bearing 10 to increase the dynamic load capability of the bearing 10 and to extend the life of the bearing 10.

Figure 7:
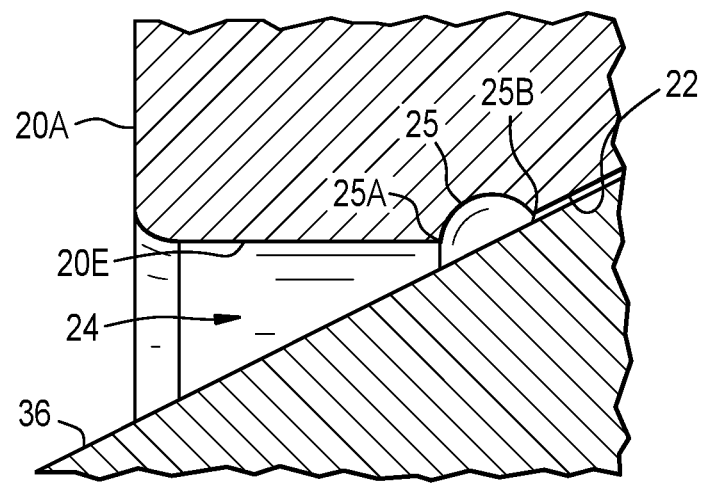
FIG. 7 is an enlarged view of Detail 7 of FIG. 4, showing an exemplary scraping groove of the spherical plain bearing.

As shown in FIGS. 3A, 4, and 7, the outer ring 20 includes scraper grooves 25 that extends radially outward into and circumferentially around the opening 24. A first scraper groove 25 is located between the first seal groove 23A and the first axial outer ring end 20A. A second scraper groove 25 is located between the second seal groove 23B and the second axial outer ring end 20B. A shown in FIG. 7, a radially outermost portion 25A of the scraper groove 25 connects to an interior cylindrical surface 20E of the outer ring 20, and a radially innermost portion 25B of the scraper groove 25 connects to the interior spherical concave bearing surface 22. The scraper groove 25 is configured to capture contaminates (e.g., debris) that would otherwise enter and reduce the efficiency of the bearing 10. The interior cylindrical surface 20E permits a scraper tool (not shown) to access the scraper groove 25 via the opening 24 at the first and second axial outer ring ends 20A, 20B to remove, or scrape away, the contaminates captured by the scraper groove 25.

While the present disclosure has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A spherical plain bearing comprising:
    an outer ring being coaxial with a longitudinal axis of the bearing, the outer ring having a first axial outer ring end, a second axial outer ring end opposing the first axial outer ring end, and an interior spherical concave bearing surface extending between the first axial outer ring end and the second axial outer ring end;
    an inner ring being coaxial with the longitudinal axis of the bearing, the inner ring having a first axial inner ring end, a second axial inner ring end opposing the first axial inner ring end, an interior cylindrical bearing surface defining a bore extending between the first axial inner ring end and the second axial inner ring end, and an exterior spherical convex bearing surface extending between the first axial inner ring end and the second axial inner ring end, the exterior spherical convex bearing surface being located in interfacial sliding engagement with the interior spherical concave bearing surface of the outer ring;
    a plurality of circumferential lubrication grooves in the exterior spherical convex bearing surface of the inner ring;
    at least one curved lubrication channel in the exterior spherical convex bearing surface of the inner ring, the at least one curved lubrication channel being positioned to intersect each of the plurality of circumferential lubrication grooves; and
    a plurality of profiled annular lubrication grooves circumferentially extending in the interior cylindrical bearing surface of the inner ring.

2. The spherical plain bearing of claim 1, further comprising:
    a first seal groove extending radially outward into the interior spherical concave bearing surface proximate the first axial outer ring end, a first annular seal disposed in the first seal groove; and
    a second seal groove extending radially outward into the interior spherical concave bearing surface proximate the second axial outer ring end, a second annular seal disposed in the second seal groove.

3. The spherical plain bearing of claim 2, wherein the first annular seal and the second annular seal comprise a rectangular central portion with flat sides and a lobe located at each corner of the rectangular central portion.

4. The spherical plain bearing of claim 2, further comprising a first scraper groove located in the interior spherical concave bearing surface of the outer ring between the first seal groove and the first axial outer ring end, and a second scraper groove located in the interior spherical concave bearing surface of the outer ring between the second seal groove and the second axial outer ring end.

5. The spherical plain bearing of claim 1, further comprising:
   a third seal groove extending radially outward into the interior cylindrical bearing surface proximate the first axial inner ring end, a third annular seal disposed in the third seal groove; and
   a fourth seal groove extending radially outward into the interior cylindrical bearing surface proximate the second axial inner ring end, a fourth annular seal disposed in the fourth seal groove.

6. The spherical plain bearing of claim 5, wherein the third annular seal and the fourth annular seal each comprise a rectangular central portion with flat sides and a lobe located at each corner of the rectangular central portion.

7. The spherical plain bearing of claim 5, further comprising at least one of:
   a first vent port extending axially inward from the first axial inner ring end to a radially outermost end of the third seal groove; and
   a second vent port extending axially inward from the second axial inner ring end to a radially outermost end of the fourth seal groove.

8. The spherical plain bearing of claim 7, further comprising at least one of:
   a first radial hole formed substantially perpendicular to and extending into the third seal groove and intersecting the first vent hole; and
   a second radial hole formed substantially perpendicular to and extending into the fourth seal groove and intersecting the second vent hole.

9. The spherical plain bearing of claim 8, wherein the first radial hole is formed on an inboard side of the third annular seal.

10. The spherical plain bearing of claim 8, wherein the second radial hole is formed on an inboard side of the fourth annular seal.

11. The spherical plain bearing of claim 1, wherein each of the plurality of profiled annular lubrication grooves comprises a contoured shape defined by a concave central portion and two opposing convex side portions.

12. The spherical plain bearing of claim 11, wherein the concave central portion conforms substantially to a circular arc defined by a continuous first radius of curvature having a first center point on a line that is perpendicular to the interior cylindrical bearing surface, and each of the convex side portions conforms substantially to circular arcs defined by blend radii having a continuous second radius of curvature having second center points on lines that are perpendicular to the interior cylindrical bearing surface.

13. The spherical plain bearing of claim 12, wherein the second radius of curvature is smaller in magnitude than a depth of the profiled annular lubrication groove.

14. The spherical plain bearing of claim 12, wherein the first radius of curvature transitions into each of the second radius of curvature of the blended radii at a transition point.

15. The spherical plain bearing of claim 1, further comprising at least one outer ring lubrication hole extending from an exterior surface of the outer ring to the interior spherical concave bearing surface of the outer ring, the at least one outer ring lubrication hole being substantially perpendicular to the longitudinal axis.

16. The spherical plain bearing of claim 15, wherein the at least one outer ring lubrication hole is radially aligned with one of the plurality of circumferential lubrication grooves.

17. The spherical plain bearing of claim 15, further comprising a lubricant disposed at the location of interfacial sliding engagement of the interior spherical concave bearing surface of the outer ring and the exterior spherical convex bearing surface of the inner ring.

18. The spherical plain bearing of claim 1, further comprising at least one inner ring lubrication hole extending from the exterior spherical convex bearing surface of the inner ring to the interior cylindrical bearing surface of the inner ring, the at least one inner ring lubrication hole being substantially perpendicular to the longitudinal axis.

19. The spherical plain bearing of claim 18, wherein the at least one inner ring lubrication hole is radially aligned with one of the plurality of profiled annular lubrication grooves.

20. The spherical plain bearing of claim 18, further comprising a lubricant disposed at a location of interfacial sliding engagement of the interior cylindrical bearing surface of the inner ring and an exterior cylindrical bearing surface of a member received in the bore of the inner ring.

21. The spherical plain bearing of claim 1, wherein each of the plurality of circumferential lubrication grooves extend continuously around the exterior spherical convex bearing surface of the inner ring.

* * * * *